United States Patent Office 2,891,074
Patented June 16, 1959

2,891,074

AROMATIC COMPOUNDS CONTAINING FLUORINE AND A PROCESS OF PREPARING THEM

Otto Scherer and Helmut Hahn, Frankfurt am Main, Germany, assignors to Farbwerke Hoechst Aktiengesellschaft vormals Meister Lucius & Bruning, Frankfurt am Main, Germany, a corporation of Germany No Drawing. Application April 7, 1954
Serial No. 421,708

Claims priority, application Germany December 24, 1953

20 Claims. (Cl. 260—384)

The present invention relates to aromatic compounds containing fluorine and to a process of preparing them.

It is known to make aromatic compounds containing fluorine bound to the nucleus according to the Schiemann process by diazotizing an amine, reacting the diazo-compound with hydrofluoboric acid, and subjecting the well dried diazonium borofluoride formed to a thermal decomposition to yield the compound fluorinated in the nucleus. As the thermal decomposition of the diazonium borofluoride can be carried out only with small quantities, the said process gives good results only on a laboratory scale.

It is also known to produce aromatic fluorine compounds on an industrial scale by diazotizing the corresponding amine dissolved in practically anhydrous hydrofluoric acid, and then heating the diazonium salt solution whereby nitrogen is split off and fluorine is introduced into the nucleus. For this reaction, however, only amines of relatively simple constitution are suitable.

It is also known that 2:4-dinitro-chlorobenzene and picryl chloride can be reacted with potassium fluoride in a high boiling solvent to yield the corresponding fluorine compounds. However, the use of high boiling solvents is often very inconvenient in the preparation of pure fluorine compounds, since either the boiling points of the solvent and the fluorine-containing compound obtained are very close or, in many cases, the compound fluorinated in the nucleus is so volatile that it passes over almost completely with the high boiling solvent.

Now, we have found that by reacting dry potassium fluoride with an aromatic compound containing chlorine bound to the nucleus and, in addition to the chlorine, at least two strongly electro-negative substituents, in the absence of a solvent and at a raised temperature, advantageously between about 175° C. and about 275° C., the corresponding fluorine substituted derivatives can be obtained. The reaction takes place more easily, the larger the number of electro-negative substituents present in the starting material. As such electro-negative substituents there come into consideration, for example, nitro, sulfo-ester, sulfonamido, carboxy-ester, carbamide, carboxyanhydride and trifluoromethyl groups and also the quinone oxygen in any desired combination. In aromatic compounds which contain such substituents and one or more chlorine atoms, the latter can be replaced partially or wholly by fluorine atoms by using appropriate quantities of potassium fluoride. The process of the present invention is applicable to benzene derivatives, and also to compounds containing condensed aromatic ring systems, such as that of naphthalene or anthracene. In order to replace 1 mol of chlorine there are generally required 2 mols of potassium fluoride, but the reaction can also be carried out with the use of a smaller or larger quantity of potassium fluoride, for example, about 8 mols.

The process of the invention is advantageously carried out in a closed vessel, for example in an autoclave and the latter may be made from a very wide variety of materials, for example, iron or glass. However, it is sometimes best to use a closed pressure vessel or a simple closed steel vessel provided with a stirrer.

In the preparation of quinones the termination of the reaction can be recognized when a sublimate ceases to be formed. In other cases it is necessary to determine the most favourable reaction period by ascertaining the extent of conversion by titrimetric determination of the ionic chlorine in the reaction product.

At the reaction temperature the reaction mixture is generally in the form of a magma, in some cases, however, the reaction takes place in the solid state, for example, in the case of chloranil. The upper limit of reaction temperature depends on the temperature at which the organic compound used undergoes carbonization and decomposition, and is about 275° C. The lower limit of reaction temperature depends on the reaction velocity. Generally at temperatures below about 175° C. the reaction takes place too slowly.

When the fluorine derivatives formed sublime easily they can be isolated by sublimation. In the other cases the reaction product may be taken up with methylene chloride, so that the inorganic salts remain behind. Alternatively, the reaction product may be distilled directly so as to leave the inorganic salts in the residue.

The process of the invention has the further advantage that the inorganic salts can easily be reconverted into potassium fluoride by heating them with hydrogen fluoride.

By the process of the invention it is possible to obtain, for example, from 1:3-dinitro-4:6-dichlorobenzene either dinitro-chlorofluorobenzene or dinitrodifluoro-benzene, depending on the conditions used, the reaction being represented as follows.

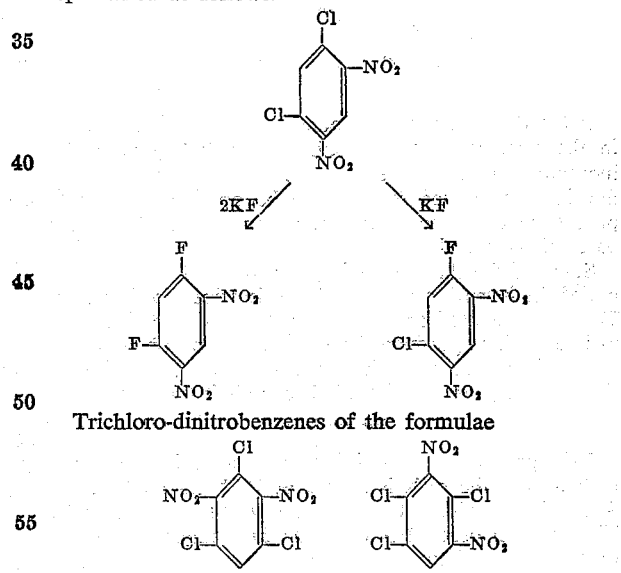

Trichloro-dinitrobenzenes of the formulae yield two dinitro-difluorochloro-benzenes having different boiling points, and in which the positions of the fluorine and chlorine atoms are not known.

Chlorine is also replaced by fluorine in compounds containing electro-negative substituents other than two nitro groups. For example, the following fluorine compounds are obtained from the corresponding chlorine compounds:

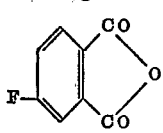

and

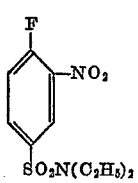

Furthermore, chlorine can be replaced by fluorine by means of potassium fluoride, for example, in the following compounds containing chlorine atoms bound to a condensed nucleus:

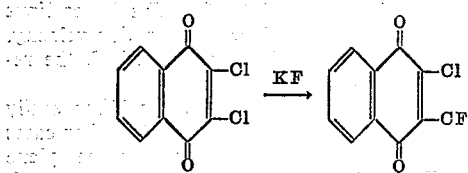

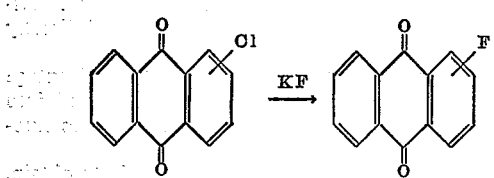

Chlorine or fluorine either in the 1 or 2 position

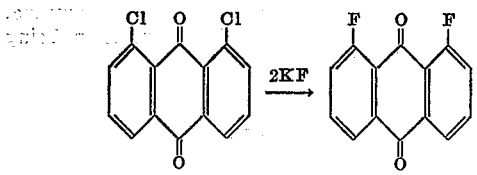

After the reaction the compound containing fluorine in the nucleus may be distilled immediately after the inorganic salts have been separated. In many cases the fluorine compounds formed can be obtained in a very pure state as a sublimate which deposits on the cooler parts of the reaction vessel.

Some of the fluorine derivatives obtained by the process of the invention have not been described in literature. They can be used as wood preservatives, pesticides and as intermediate products for the preparation of dyestuffs.

The following examples serve to illustrate the invention, but they are not intended to limit it thereto:

Example 1

237 grams of 1:3-dinitro-4:6-dichlorobenzene are melted, and the melt is stirred at 190° C.–200° C. for 4 to 5 hours with 240 grams of dry potassium fluoride. The reaction product is taken up in methylene chloride to separate it from the salt residue, and the resulting 1:3-dinitro-4:6-difluorobenzene is distilled. A yield of 149 grams is obtained boiling at 132° C. under 2 mm. pressure and melting at 74° C.–75° C.

Example 2

237 grams of 1:3-dinitro-4:6-dichlorobenzene are melted, and the melt is stirred at 190° C.–200° C. for 5 hours with 120 grams of dry potassium fluoride. 145 grams of 1:3-dinitro-4-chloro-6-fluorobenzene boiling at 144° C.–145° C. under 2 mm. pressure are obtained.

Example 3

136 grams of 1:3-dinitro-2:5:6-trichlorobenzene are treated in the molten state for 12 hours with 125 grams of dry potassium fluoride. The reaction product is then separated from the residue and distilled. 70 grams of a new dinitro-chloro-difluorobenzene boiling at 117° C. under 1 mm. pressure are obtained.

Example 4

136 grams of 1:3-dinitro-2:4:6-trichlorobenzene are reacted at 190°–200° C. for 24 hours with 150 grams of dry potassium fluoride. There are obtained by distillation, 27 grams of a new dinitro-chloro-difluorobenzene boiling at 97° C. under 1 mm. pressure.

Example 5

115 grams of 3-nitro-4-chloro-benzoic acid ethyl ester are stirred at 230° C. for 24 hours with 60 grams of dry potassium fluoride. By distillation there are obtained 53 grams of 3-nitro-4-fluoro-benzoic acid-ethyl ester boiling at 128° C.–130° C. under 0.5 mm. pressure and melting at 46° C.–47° C.

Example 6

216 grams of 3-nitro-6-chloro-benzoic acid methyl ester are reacted at 190 C.–200° C. for 24 hours with 116 grams of dry potassium fluoride. By subsequent distillation, 140 grams of 3-nitro-6-fluoro-benzoic acid methyl ester are obtained boiling at 126° C.–128° C. under 0.8 mm. pressure and melting at 68° C.–69° C.

Example 7

136 grams of 1:3-dinitro-4-chloro-5-trifluoromethyl-benzene are treated at 190° C.–200° C. for 7 hours with 60 grams of dry potassium fluoride. 108 grams of the new 1:3-dinitro-4-fluoro-5-trifluoromethyl-benzene are obtained boiling at 99° C.–100° C. under 0.5 mm. pressure and melting at 34° C.–35° C.

Example 8

180 grams of 4-chloro-phthalic anhydride are reacted in an autoclave at 200° C. for 24 hours with 120 grams of dry potassium fluoride. 86 grams of 4-fluoro-phthalic anhydride boiling at 148° C. under 21 mm. pressure and melting at 75° C. are obtained.

Example 9

114 grams of 2:3-dichloro-naphthoquinone are heated in a closed glass flask at 210° C. for 24 hours with 60 grams of dry potassium fluoride. During that period 96 grams of a sublimate become deposited in the upper cooler part of the flask and the product is again sublimed at 170° C. under 9 mm. pressure. 70 grams of the new 2-chloro-3-fluoro-naphthoquinone melting at 175° C. are obtained.

Example 10

243 grams of 1-chloranthraquinone are reacted with 160 grams of dry potassium fluoride at 225° C. for 25 hours in a closed steel cylinder. During that period 178 grams of a sublimate melting at 223° C.–225° C. becomes deposited on the cover of the cylinder. By treating with water the residue still remaining in the cylinder, and re-crystallizing the undissolved material from benzene, there is obtained a further quantity of the new 1-fluoranthraquinone. The total yield amounts to 199 grams melting at 226° C.

Example 11

122 grams of 2-chloranthraquinone are heated at 260° C.–270° C. for 48 hours with 65 grams of dry potassium fluoride in a closed vessel provided with a stirrer. The water-insoluble part of the reaction product is recrystallized from benzene yielding 60 grams of 2-fluoranthraquinone melting at 196° C.

Example 12

140 grams of 1:8-dichloranthraquinone are heated at 220° C.–230° C. for 35 hours with 115 grams of dry potassium fluoride. During the reaction a sublimate becomes deposited on the cover of the cylinder, and the sublimate is united with the water-insoluble portion of the reaction product still remaining in the cylinder, and the whole is recrystallized from benzene. 85 grams of the new 1:8-difluoranthraquinone melting at 222° C. are obtained.

*Example 13*

An intimate mixture of 123 grams of chloranil and 125 grams of dry potassium fluoride are heated in a vessel at 200° C. for 22 hours, while stirring well, whereby 83 grams of a sublimate are formed. By a further fractional sublimation of this product there are obtained 64 grams of 2:5-difluoro-3:6-dichloro-1:4-benzoquinone melting at 213° C.–215° C., and in addition 16 grams of 2-fluoro-3:5:6-trichloro-1:4-benzoquinone melting 245° C.

*Example 14*

150 grams of 1-chloro-2-nitrobenzene-4-sulfonic acid diethylamide are reacted with 60 grams of dry potassium fluoride at about 200° C. for 21 hours. 79 grams of the new 1-fluoro-2-nitrobenzene-4-sulfonic acid diethylamide are obtained boiling at 185° C. under 2 mm. pressure and melting at 73° C.–74° C.

We claim:

1. As a new compound dinitro-chloro-difluorobenzene possessing a boiling point (1 mm. pressure) of 117° C.
2. As a new compound dinitro-chloro-difluorobenzene possessing a boiling point (1 mm. pressure) of 97° C.
3. As a new compound 2-chloro-3-fluoronaphthoquinone.
4. As a new compound 1-fluoroanthraquinone.
5. As a new compound 1.8-difluoroanthraquinone.
6. As a new compound 2.5-difluoro-3.6-dichloro-1.4-benzoquinone.
7. As a new compound 2-fluoro-3.5-6-trichloro-1.4-benzo-quinone.
8. As a new compound 2-nitro-4-diethylsulfonamido-1-fluorobenzene.
9. The process for preparing an aromatic quinone containing at least one nuclear fluorine atom which comprises reacting an aromatic quinone containing at least one chlorine atom at the next available carbon atom relative to one of the quinone carbon atoms with an excess of dry potassium fluoride at a temperature ranging from about 175° C. to the decomposition temperature of the aromatic compound present and in the absence of a solvent.
10. A process as defined in claim 9, including the further step of recovering the nuclear fluorinated product by sublimation.
11. The process for preparing a fluorobenzene which comprises reacting benzene containing at least two strong electronegative substituents and at least one chlorine atom in para position to one of said electronegative substituents with an excess of dry potassium fluoride at a temperature ranging from about 175° C. to about 275° C. and in the absence of a solvent.
12. The process for preparing naphthoquinone containing at least one nuclear fluorine atom which comprises reacting naphthoquinone containing at least one chlorine atom on the carbon atom directly adjacent one of the quinone carbon atoms with an excess of dry potassium fluoride at a temperature of about 175° C. to about 275° C. and in the absence of a solvent.
13. The process for preparing anthraquinone containing at least one nuclear fluorine atom which comprises reacting anthraquinone containing at least one chlorine atom in one of the benzene rings with an excess of dry potassium fluoride at a temperature of about 175° C. to about 275° C. and in the absence of a solvent.
14. A process for preparing aromatic compounds containing at least one nuclear fluorine atom which comprises reacting aromatic compounds containing at least two strong electronegative nuclear substituents and at least one nuclear chlorine atom and being selected from the group consisting of aromatic compounds, in which at least one nuclear chlorine atom is in an ortho position relative to at least one of said electronegative substituents and aromatic compounds in which at least one nuclear chlorine atom is in a para position relative to at least one of said electronegative substituents, with an excess of dry potassium fluoride at temperatures between about 175° C. and the decomposition temperature of the aromatic compound present and in the absence of solvents.
15. A process for preparing aromatic compounds containing at least one nuclear fluorine atom which comprises reacting aromatic compounds containing at least two strong electronegative nuclear substituents and a plurality of nuclear chlorine atoms and being selected from the group consisting of aromatic compounds, in which at least one nuclear chlorine atom is in an ortho position relative to at least one of said electronegative substituents and aromatic compounds in which at least one nuclear chlorine atom is in a para position relative to at least one of said electronegative substituents, with an excess of dry potassium fluoride at temperatures between about 175° C. and about 275° C. and in the absence of solvents, and terminating the reaction when only a part of the chlorine atoms have been replaced by fluorine atoms.
16. A process for preparing aromatic compounds containing at least one nuclear fluorine atom which comprises reacting a benzene derivative containing at least two strong electronegative nuclear substituents and at least one nuclear chlorine atom and being selected from the group consisting of benzene derivatives, in which at least one nuclear chlorine atom is in an ortho position relative to at least one of said electronegative substituents and benzene derivatives in which at least one nuclear chlorine atom is in a para position relative to at least one of said electronegative substituents, with an excess of dry potassium fluoride at temperatures between about 175° C. and about 275° C. and in the absence of solvents.
17. A process for preparing aromatic compounds containing at least one nuclear fluorine atom which comprises reacting a benzene derivative containing at least two strong electronegative nuclear substituents and a plurality of nuclear chlorine atoms and being selected from the group consisting of benzene derivatives, in which at least one nuclear chlorine atom is in an ortho position relative to at least one of said electronegative substituents and benzene derivatives in which at least one nuclear chlorine atom is in a para position relative to at least one of said electronegative substituents, with an excess of dry potassium fluoride at temperatures between about 175° C. and about 275° C. and in the absence of solvents and terminating the reaction when only a part of the chlorine atoms have been replaced by fluorine atoms.
18. A process for preparing aromatic compounds containing at least one nuclear fluorine atom which comprises reacting aromatic compounds containing at least two nuclear nitro radicals and at least one nuclear chlorine atom and being selected from the group consisting of aromatic compounds in which at least one nuclear chlorine atom is in an ortho position relative to at least one of said nitro groups and aromatic compounds in which at least one nuclear chlorine atom is in a para position relative to at least one of said nitro groups, with an excess of dry potassium fluoride at temperatures between about 175° C. and about 275° C. and in the absence of solvents.
19. A process for preparing aromatic compounds containing at least one nuclear fluorine atom which comprises reacting an anthracene derivative containing at least two strong electronegative nuclear substituents and at least one nuclear chlorine atom and being selected from the group consisting of anthracene derivatives, in which at least one nuclear chlorine atom is in an ortho position relative to at least one of said electronegative substituents and anthracene derivatives in which at least one nuclear chlorine atom is in a para position relative to at least one of said electronegative substituents, with an excess of dry potassium fluoride at temperatures between about 175° C. and about 275° C. and in the absence of solvents.

20. The process for preparing a fluorobenzene which comprises reacting benzene containing at least two strong electronegative substituents and at least one chlorine atom in ortho position to one of said electronegative substituents with an excess of dry potassium fluoride at a temperature ranging from about 175° C. to about 275° C. and in the absence of a solvent.

References Cited in the file of this patent
UNITED STATES PATENTS

| | | |
|---|---|---|
| 2,013,030 | Calcott et al. | Sept. 3, 1935 |
| 2,179,605 | Wesson | Nov. 14, 1939 |
| 2,257,093 | Friederich et al. | Sept. 30, 1941 |
| 2,378,453 | Weinmayr | June 19, 1945 |
| 2,403,576 | Bradley | July 9, 1946 |
| 2,685,591 | Jenny et al. | Aug. 3, 1954 |